Sept. 21, 1965     C. F. SWENSON     3,208,040
LINE-CASTING MACHINE
Filed March 14, 1961     9 Sheets-Sheet 3

INVENTOR.
CARL F. SWENSON
BY
ATTORNEY

Sept. 21, 1965 C. F. SWENSON 3,208,040
LINE-CASTING MACHINE
Filed March 14, 1961 9 Sheets-Sheet 5

INVENTOR.
CARL F. SWENSON
BY
ATTORNEY

Fig. 11.

INVENTOR.
CARL F. SWENSON

3,208,040
Patented Sept. 21, 1965

3,208,040
LINE-CASTING MACHINE
Carl F. Swenson, Hillsdale, N.J., assignor, by mesne assignments, to Powers & Eaton Industries, Inc., Hawthorne, N.J., a corporation of New Jersey
Filed Mar. 14, 1961, Ser. No. 95,577
34 Claims. (Cl. 340—147)

The present invention relates to a line-casting machine and more particularly to an improved line-casting machine which will be automatically controlled without the use of a manually operable keyboard.

Generally speaking, line-casting machines comprise a magazine into which are stored matrices having the letters of the alphabet and other symbols thereon. A manually operable keyboard is operatively connected to the magazine and as each key is depressed a matrix is released from the magazine and assembled in an elevator. The keys are operated until a sufficient number of matrices are released from the magazine and assembled in the elevator to complete a line of script. The elevator is then raised and the matrices are transferred to a slide carriage. The slide carriage is thereafter moved in front of a mechanism which makes a lead impression of the line of matrices. The matrices are then returned to the magazine.

Such line-casting machines require manual operation of the keyboard by an operator who reads the desired material from a sheet and depresses each key in a manner similar to the operation of a typewriter.

Heretofore, mechanisms have been developed to control such line-casting machines automatically by a perforated tape which is read by a tape reader and which releases the matrices from the magazine. Each combination of code holes or perforations in the tape will release a matrix from the magazine or will actuate the performance of some other function of the machine, such as "raise the elevator," etc.

Some of such automatically controlled line-casting machines have been operated by mechanical links, levers, etc. However, such mechanisms are comparatively slow, and because they are completely mechanical they are limited by inertial and wear problems; they are not easily adapted to most model typesetting machines and installation is considerably more complicated.

Other automatic line-casting machines have been electrically operated by a pyramid-type of switching circuits. However, it has been found that such pyramid-type switching circuits are dependent on the speed of electro-mechanical devices, on the inherent problems of switching contacts, such as wear and dependability, both of which are a function of quality and quality is costly.

Such automatic line-casting machines, both electrical and mechanical, also utilize tape readers which read the tape by pins insertable into the code holes in the tape and which utilize a pin wheel whose pins are insertable in a central opening in the tape to move the tape along. As a result, such tapes tend to wear and if inadvertently pulled, they are usually torn and sometimes cause damage to the delicate pin mechanism of the tape reader.

In addition, the tape must stop on each code to be read on these devices and then passed on by a tape of Geneva drive of the sprocket drive to expose the next code. This stop-go motion is also hard on the tape and necessarily time-consuming.

The present invention overcomes these drawbacks and provides an improved mechanism for controlling an automatic line-casting machine which has much greater speed capabilities and requires a minimum amount of maintenance.

Another object of the present invention is the provision of an improved mechanism for controlling an automatic line-casting machine which permits a smoother and more positive reading of the tape.

Another object of the present invention is the provision of an improved mechanism for controlling an automatic line-casting machine which is electronically controlled.

Another object of the present invention is the provision of an improved mechanism for controlling an automatic line-casting machine which will permit faster operations.

Another object of the present invention is the provision of an improved mechanism for controlling an automatic line-casting machine in which a dual character circuit will introduce a delay.

Another object of the present invention is the provision of an improved mechanism for controlling an automatic line-casting machine in which the tape reader has improved means for positively reading the tape.

Another object of the present invention is the provision of an improved mechanism for controlling an automatic line-casting machine which will permit the operator to manually control the elevator when desired.

Another object of the present invention is the provision of an improved mechanism for controlling an automatic line-casting machine having improved means for selecting a predetermined circuit or path and to pulse a signal through the predetermined circuit to release a matrix or perform some other function of the machine.

Another object of the present invention is the provision of an improved mechanism for controlling an automatic line-casting machine in which the speed of the tape reader can be controlled to the best operational speed of the machine.

Another object of the present invention is the provision of an improved mechanism for controlling an automatic line-casting machine in which the feeding of the tape can be reversed.

Another object of the present invention is the provision of an improved mechanism for controlling an automatic line-casting machine which will operate quietly.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

For convenience, the present invention will first be described generally and the various parts will be described in detail under separate headings.

GENERAL DESCRIPTION

Figure 13:
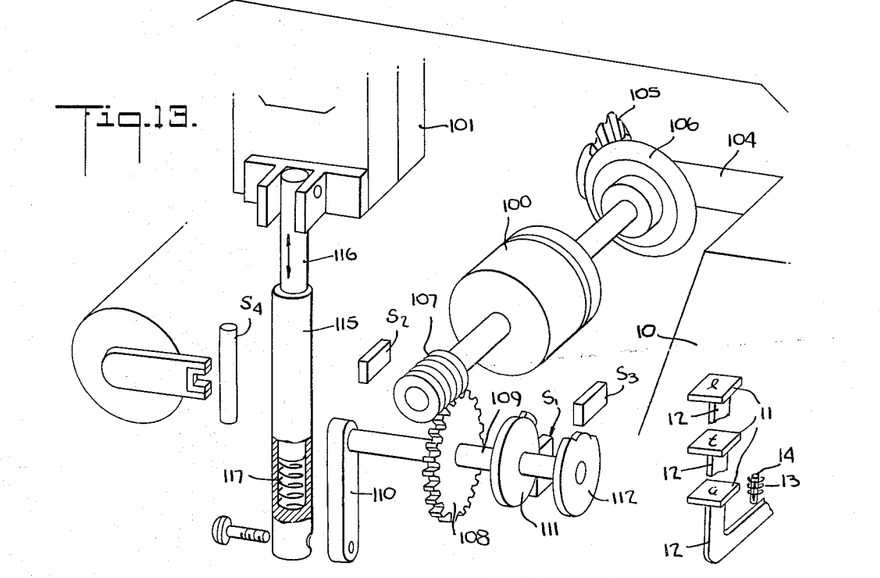
FIG. 13 is a diagrammatic exploded perspective view showing the elevator raising mechanism.

Referring more particularly to FIG. 13, the line-casting machine comprises a keyboard 10 having a plurality of individual keys 11 (only three of which are shown in the drawings for clarity). Each of the keys 11 has a letter or other symbol on its face and when depressed is adapted to release a matrix from the magazine (not shown) through its extension arm 12 and other link and lever mechanisms (not shown).

In accordance with the present invention, each of the keys 11 is depressed by a solenoid 13 which may be located beneath the keys 11 and above extension arm 12 or on weights behind the keyboard or on the reeds directly, as shown in FIG. 13. When a particular solenoid is energized by a circuit which will be described hereinafter, its armature 14 is depressed to lower the extension 12 of the key 11 which in turn actuates the matrix-releasing mechanism to release a particular matrix from the magazine. It will be understood, of course, that the particular arrangement of the solenoids 13 for the actuation of the keys 11 shown in the drawings is merely one manner which may be used with the present invention and that other arrangements may also be used.

Figure 5:
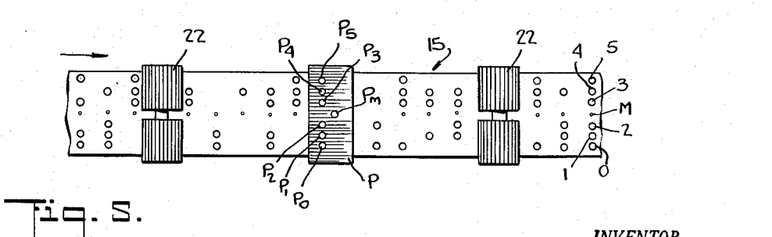
FIG. 5 is a top view showing the tape in motion through the tape reader and showing the code perforations in the tape.

The circuit to the particular solenoid 13 which actuates a particular key 11 is closed by a perforated code tape 15 as shown in FIG. 5. The tape has six code openings designated 0, 1, 2, 3, 4, 5 which will open a particular path in the circuit depending upon the particular combination of code holes which is read by a tape reader, which will be described in greater detail hereinafter. The tape 15 has a central smaller opening M to permit a signal to be pulsed through the circuit to energize a particular solenoid 13 and release a particular matrix.

As shown in FIG. 5 the openings have been designated "0," "1," and "2" on one side of the central pulsing hole M and "3," "4" and "5" on the other side of the central pulsing opening M. By a combination of these code holes it will be noted that a number of paths through the circuit can be opened, each of the paths leading to one of the solenoids 13 which is controlled thereby.

In addition to releasing matrices from the magazine, the tape 15 also controls all of the other functions of the machine, such as "elevate" "upper rail," "lower rail," etc. In all, through a shift and unshift circuit, hereinafter described, the perforated tape 15 is capable of 128 combinations to operate the line-casting machine fully automatically.

Figure 4:
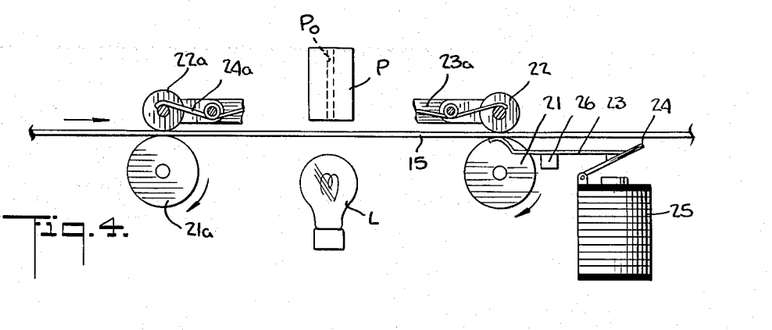
FIG. 4 is a diagrammatic side elevational view showing the operation of the improved tape reader.

The coded tape 15 is read by a photo-electric mechanism, shown schematically in FIGS. 4 and 5, which comprises a light source L and a photo-diode housing P comprising photo-diodes $P_0$, $P_1$, $P_2$, $P_3$, $P_4$ and $P_5$ overlying the paths of openings 0, 1, 2, 3, 4 and 5, respectively, and a centrally located photo-diode $P_m$ overlying the path of the central pulsing opening M.

The photo-diodes $P_0$ to $P_5$ are adapted to read the tape 15 to determine whether there is a hole present therebeneath or whether there is a no-hole (absence of a hole) therebeneath. In either case, a circuit is closed to a particular solenoid 13.

Figure 1:
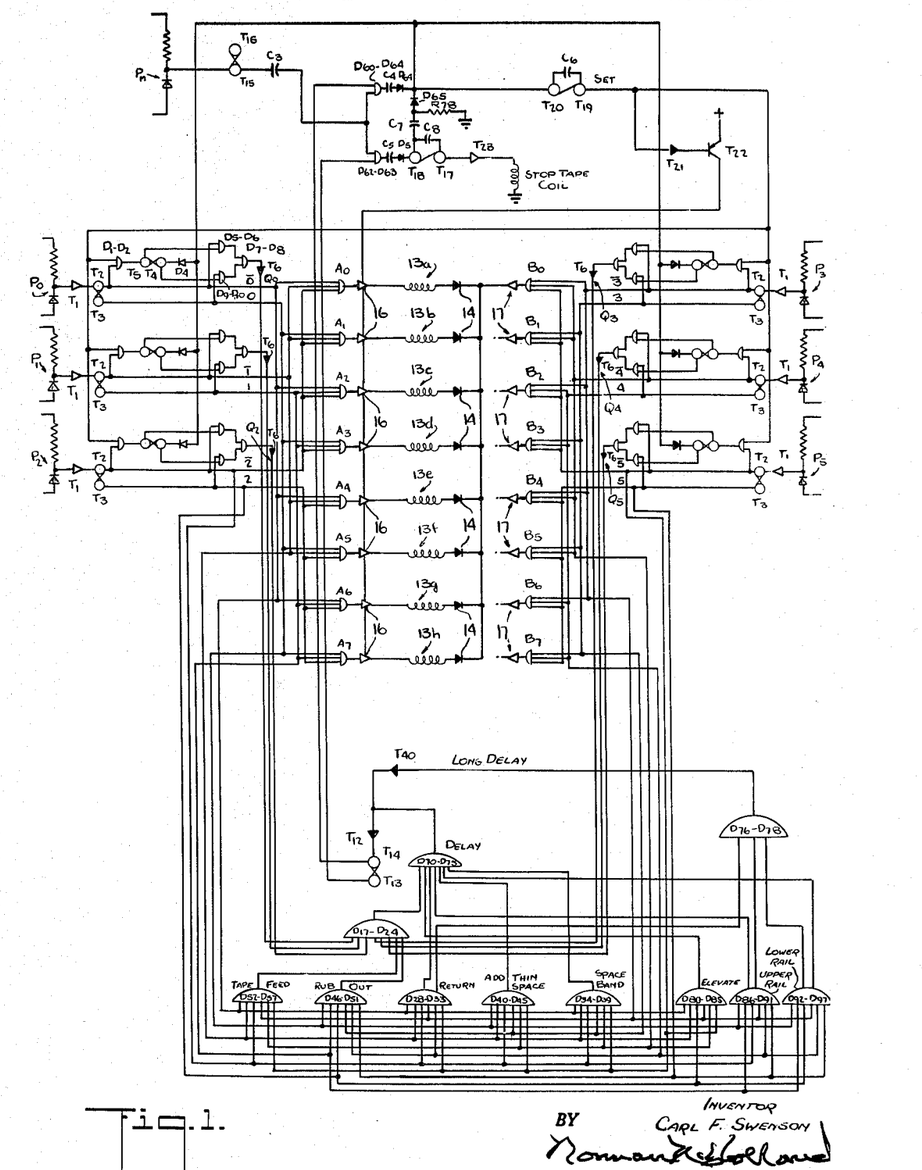
FIG. 1 is a schematic simplified diagram showing the improved automatic control for the line-casting machine of the present invention.

Referring to FIG. 1 which shows eight solenoids 13 only, for clarity, the signals from the photo-diodes $P_0$ to $P_5$ are amplified by an amplifier $T_1$ and by means of the flip-flop $T_2$ and $T_3$ a "hole" line is closed or the "no-hole" line is closed. In each case the particular "hole" line and "no-hole" line closed corresponds to the particular combination of code holes 0 to 5 appearing on the tape 15 when it is read by the photo-diodes $P_0$ to $P_5$ in the photo-diode housing P. For this reason the "hole" lines in FIG. 1 have been designated 0, 1, 2, 3, 4 and 5 corresponding to the designations of the code holes 0 to 5 in tape 15, to indicate that if a particular code hole is read the corresponding "hole" line is closed and the "no-hole" lines in FIG. 1 have been designated $\bar{0}$, $\bar{1}$, $\bar{2}$, $\bar{3}$, $\bar{4}$, and $\bar{5}$ to indicate that if a particular code hole in the tape does not appear, the corresponding "no-hole" line will be energized.

Each "hole" line "0" to "2" and each "no-hole" line $\bar{0}$ to $\bar{2}$ is connected to a plurality of gates $A_0$ to $A_7$ connected through amplifying circuits 16 to one side of solenoids 13 and each "hole" line 3 to 5 and each "no-hole" line $\bar{3}$ to $\bar{5}$ is connected to a plurality of gates $B_0$ to $B_7$ connected through amplifying circuits 17 to the other side of the solenoids 13. Each of these gates are "and" gates so that all the conditions of the gate must be satisfied before the gate will open.

The "hole" line 0 is connected to gates $A_1$, $A_3$, $A_5$ and $A_7$ and corresponding "hole" line 3 on the other side is connected to gates $B_1$, $B_3$, $B_5$ and $B_7$. The "no-hole" lines $\bar{0}$ and $\bar{3}$ are connected to gates $A_0$, $A_2$, $A_4$ and $A_6$ and to gates $B_0$, $B_2$, $B_4$ and $B_6$, respectively. The "no-hole" lines $\bar{1}$ and $\bar{4}$ are connected, respectively, to gates $A_0$, $A_1$, $A_4$ and $A_5$ and $B_0$, $B_1$, $B_4$ and $B_5$ whereas the "hole" lines 1 and 4 are connected to gates $A_2$, $A_3$, $A_6$ and $A_7$ and to $B_2$, $B_3$, $B_6$ and $B_7$. Finally, "no-hole" lines $\bar{2}$ and $\bar{5}$ are connected to gates $A_0$, $A_1$, $A_2$, and $A_3$ and $B_0$, $B_1$, $B_2$ and $B_3$ while "hole" lines 2 and 5 are connected to gates $A_4$, $A_5$, $A_6$, and $A_7$, and $B_4$, $B_5$, $B_6$ and $B_7$.

With this arrangement, a particular gate on each side of the solenoids 13 will be opened each time the tape is read by the photo-diodes $P_0$ to $P_5$. For example, gate $A_0$ will only operate if codes $\bar{0}$, $\bar{1}$ and $\bar{2}$ (i.e., holes 0, 1, 2 do not appear on the tape) are read by the photo-diode and $B_0$ will be opened when codes $\bar{3}$, $\bar{4}$, $\bar{5}$ are read by the photo-diodes. On the other hand, gate $A_7$ and $B_7$ will be only operated if the code 0, 1, 2, 3, 4 and 5 (i.e., all the holes) appears on the tape.

Since the solenoids 13 are between the two sets of gates $A_0$–$A_7$ and $B_0$–$B_7$, a path through a single solenoid only is opened depending on which gates have been opened responsive to the code combination on the tape.

This is shown in the simplified version of the solenoid bank shown in FIG. 1. Each gate $A_0$–$A_7$ is shown as being connected to the solenoids 13a to 13h, respectively. The gate $B_0$ is shown connected to all the solenoids 13a to 13h. For clarity, gates $B_1$–$B_7$ have been shown as being unconnected to any solenoids.

With this arrangement if the photo diodes read the code 0, 1, 2, $\bar{3}$, $\bar{4}$, $\bar{5}$ the gates $A_7$ and $B_0$ are opened and the path through solenoid 13a is opened. Similarly, if the code is $\bar{0}, 1, 2, \bar{3}, \bar{4}, \bar{5}$ then gates $A_6$ and $B_0$ will be opened to close the circuit to solenoid $13g$. The paths through the other solenoids $13a$ to $13f$ are opened in a similar manner.

It will thus be seen that depending upon the code combination in the tape which is read by the tape reader, a predetermined path will be opened through a particular solenoid and that when the central hole M on the tape is then read by the photo-diode $P_m$ the signal will be pulsed through the predetermined path in the circuit to energize that solenoid only which will release a matrix or perform another function of the machine.

Inherent within the basic design of a typecasting machine, it takes longer for two successive matrices to be selected from the same channel of a magazine than it does for two successive matrices from different channels of the same magazine. When operating at higher speeds it is necessary to slow the reader down when dual characters are sensed so that the second character of the dual would not be left in the magazine.

In order to avoid this, the present invention introduces a delay in the machine which will stop the tape reader for a predetermined amount of time so that after the first character is released the machine can catch up before the second character will be released.

As shown in FIG. 1, the gate $D_1$–$D_2$ has a positive "set" signal from the pulsing circuit, described more fully hereinafter, and receives a signal from the transistor $T_2$ each time a code is read by the photo-diodes. If a hole appears under the same photo-diode in successive code combinations in the tape, the points $Q_0$ to $Q_5$ are at a negative potential indicating coincidence. If on the other hand the first and second holes were different points, $Q_0$ to $Q_5$ would be at ground potential for no coincidence.

Each of the points $Q_0$ to $Q_5$ are connected to the $D_{17}$–$D_{22}$ portion of "and" gate $D_{17}$–$D_{24}$. If all the $Q_0$ to $Q_5$ are at a negative potential, indicating coincidence of two successive codes, the gate $D_{17}$–$D_{24}$ is opened and the "or" delay gate $D_{70}$–$D_{75}$ is opened which places flip-flop $T_{13}$–$T_{14}$ in condition to insert a delay in the pulsing circuit and to stop the tape reader.

If there is no coincidence, the collector of $T_{14}$ is at ground potential and that of $T_{13}$ is at a negative potential and the opposite occurs if there is coincidence. Transistors $T_{13}$ and $T_{14}$ lead to "and" gates $D_{62}$–$D_{63}$ and $D_{60}$–$D_{61}$, respectively, and each of these gates also receives a signal from the central pulsing photo-diode $P_m$ through flip-flop $T_{15}$–$T_{16}$ and condenser $C_3$. If there is no coincidence, flip-flop $T_{20}$–$T_{19}$ will operate the pulsing transistor $T_{22}$ to send a pulse through the path which has been opened by photo-diodes $P_0$ to $P_5$ to energize a particular solenoid or to perform some function of the machine.

However, if there is coincidence, the oscillator $T_{17}$–$T_{18}$ will introduce a delay in the pulsing of the signal through flip-flop $T_{19}$–$T_{20}$ to allow the second matrix to reach its releasing position and at the same time will stop the tape from being fed to prevent other matrices from being released. After a predetermined amount of time, the signal is released through the transistor $T_{22}$ to release the second matrix and the tape is again allowed to move.

After each cycle, a signal from the pulsing circuit resets the flip-flop of $T_4$–$T_5$ of the memory circuit to its normal state so that the cycle can start again.

Delays are also introduced in a similar manner for "return," "space band," and "add thin space" signals. For "elevate," "lower rail" and "upper rail" signals, extra long delays are introduced to permit these functions to be completed.

Tape reader

The improved tape reader of the present invention is shown in FIGS. 3 to 5A and comprises a housing 20 within which is housed a source of light L which may be a single filament lamp. As set forth above, the diode housing P houses the photo-diodes $P_0$ to $P_5$ and central photo-diode $P_m$ which overlie the opening 0 to 5 on the tape and central opening M.

Figure 3:
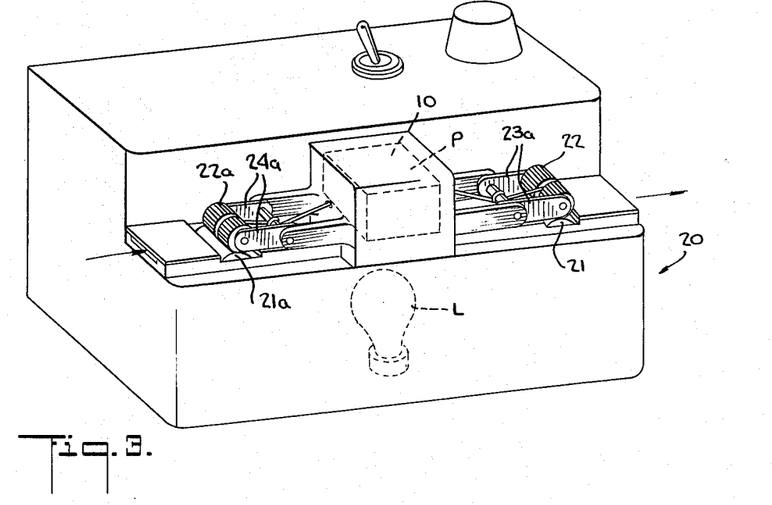
FIG. 3 is a perspective view showing the improved tape reader used with the present invention.

The central photo-diode $P_m$ is slightly downstream of the other six photo-diodes $P_0$ to $P_5$. The central pulsing hole M is smaller than other code holes $P_0$ to $P_5$ so that the signal through the circuit is begun and finished while the code holes 0 to 5 are still being read by their respective photo-diodes $P_0$ to $P_5$.

The tape 15 is moved over the light source L by a plurality of friction drive rolls 21 and 21a driven by a suitable motor (not shown).

Directly above each of the rubber rolls 21 and 21a are knurled spring loaded idle pressure rollers 22 and 22a mounted on arms 23a and 24a respectively which press the tape 15 into contact with drive rolls 21 to permit the tape to be advanced thereby.

The light source L is lit and the light shown upwardly through a particular code combination on the tape 15, depending on the code holes 0 to 5 which are passed thereover, so that the respective photo-diodes $P_0$ to $P_5$ will set up a path in the circuit through one of the operating solenoids as discussed above. As the tape advances further the central pulsing opening M then passes beneath the offset central photo-diode $P_m$ to pulse the signal through the path.

Located beneath the idle pressure roller 22 is a lever 23 which is connected to the armature 24 of a stop-tape solenoid 25. When the solenoid 25 is energized it will swing its armature 24 downwardly and thereby pivot the lever 23 on fulcrum 26 to raise the tape 15 away from the friction drive roller 21. This prevents the tape 15 from being moved during certain functions of the machine which require that the tape feeding be stopped.

After this condition has passed and it is desired to again move the tape 15 the solenoid 24 is de-energized so that the lever 23 is lowered and the tape 15 is again brought into contact with the friction drive roller 21 to permit it to move.

Figure 5A:
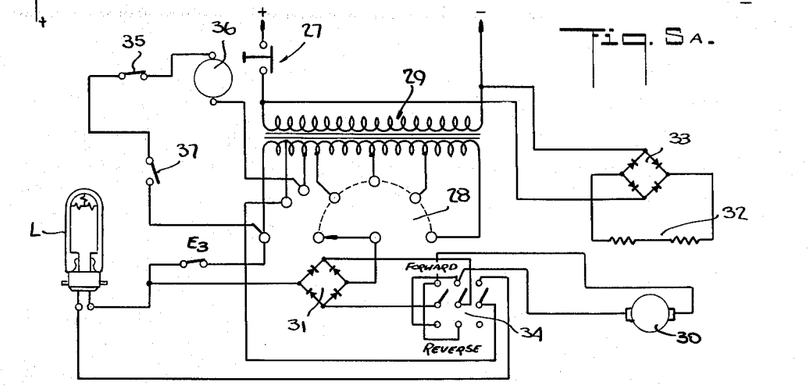
FIG. 5A is a schematic view showing the circuit for controlling the tape reader.

The circuit for controlling the tape reader is shown in FIG. 5A and comprises a suitable variable speed drive motor 30 controlled by a master switch 27 and a multi-positioned selector switch 28 which takes power from a multi-tap transformer 29 to vary the speed of the motor 30. The armature current of motor 30 is rectified by a rectifier 31 and the field current 32 of motor 30 is rectified by field rectifier 33. With this structure the speed of the tape 15 can be varied by the switch 28 so that it will move at the best speeds for the varying conditions encountered in typesetting operations.

The direction of the motor 30 can be reversed by a suitable reversing switch 34 to reverse the direction of the tape. When the tape is reversed the light source L is shut off so that the photo-diodes $P_0$ to $P_5$ and $P_m$ will not be activated by the reverse code.

Figure 12:
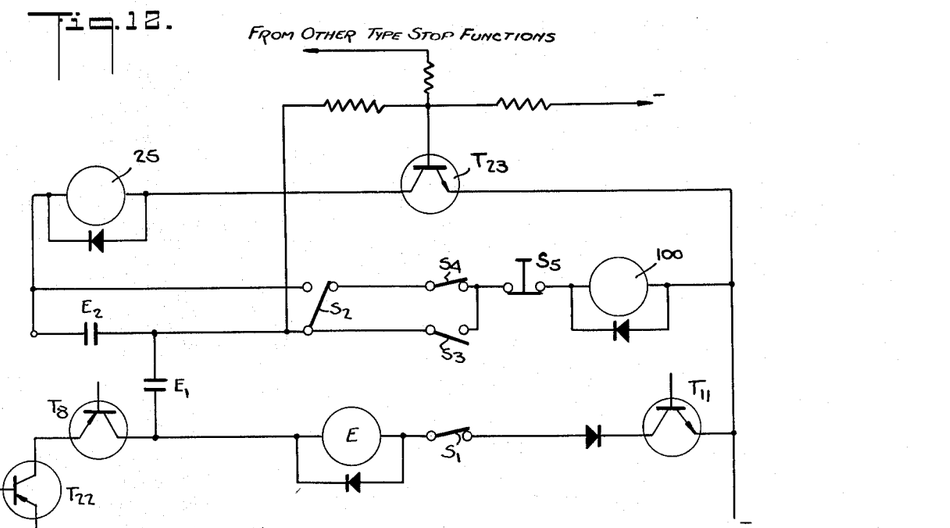
FIG. 12 is a schematic diagram showing the circuit for controlling the raising and lowering of the elevator.

Suitable safeties, such as a tight tape switch 35 and tight tape relay 36 and an end tape switch 37 are positioned in contact with the tape so that if the tape 15 runs out or an excessive pressure is exerted on the tape 15 a circuit is closed to base resistor of stop tape transistor $T_{23}$ of FIG. 12.

It will be seen that with this structure there is a smooth operation which will also prevent the tape from being torn. The present structure will also permit the tape to move in either direction at a more positive and uniform speed.

Power solenoid system

Figure 2:
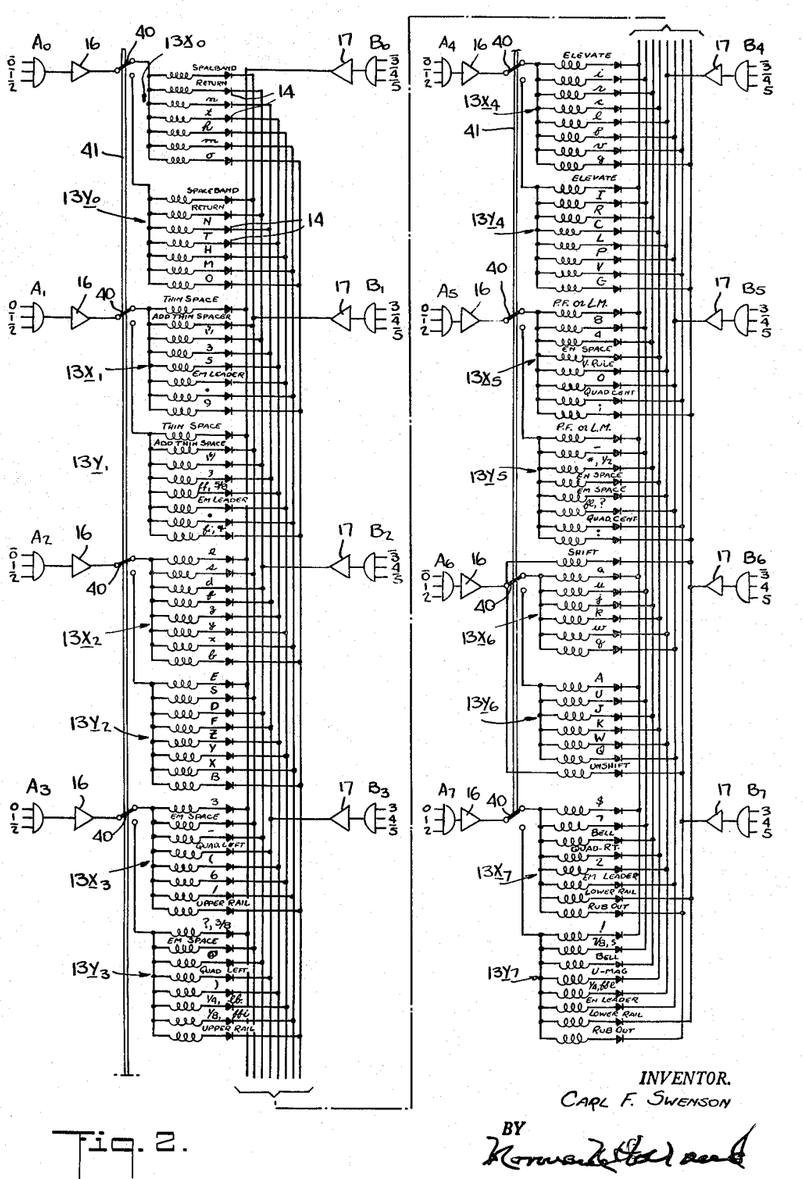
FIG. 2 is a schematic diagram showing the solenoids for releasing the individual matrices and for performing the other functions of the machine.

FIG. 2 shows a diagrammatic wiring diagram of the solenoids 13 which actuate the various keys on the line casting machine to permit the matrices to be released or perform some other function of the machine. The principle of operation has been described in General Description in connection with FIG. 1 above.

Since the system utilizes six photo-diodes $P_0$ to $P_5$ and six code holes 0 to 5, the six holes combination may be arranged to give 64 individually selected outputs. The first three code holes 0, 1, 2 are arranged in pyramid fashion to give eight separate outputs in gates $A_0$ to $A_7$ and the other three code holes 3, 4, 5 are arranged to give another eight separate outputs in gates $B_0$ to $B_7$. By placing the operating solenoids and relays between the two groups of eight, so that the individual outputs on one side are electrically connected to each output on the other side, a total of sixty-four selectable circuits are possible. By utilizing a shift and unshift circuit, described hereinafter, 128 circuits may now be used.

The gates $A_0$ to $A_7$ actuate the power amplifier 16 connected to a group of eight solenoids $13X_0$ to $13X_7$ called the first bank. The power amplifiers 16 may also be connected to a group of eight additional solenoids $13Y_0$ to $13Y_7$ called the second bank, when a plurality of switches 40 between solenoid banks 13X and 13Y are shifted from one bank 13Y to the other bank 13X by a shift bar 41 connecting the switches 40 together.

Each of the individual solenoids has a diode 14 which permits current to flow in one direction only and thus prevents feed-back. The second group of gates $B_0$ to $B_7$ are connected to the second group of power amplifiers 17 which are connected to the individual solenoids in each group $13X_0$–$13X_7$ and $13Y_0$–$13Y_7$. The gates $B_0$ through $B_7$ are generally connected to the first through eighth solenoids, respectively, in each solenoid group.

Thus, with this arrangement and the switches 40 in the shift positions shown in FIG. 2, if code combination $\bar{0}$, $\bar{1}$, 2, $\bar{3}$, $\bar{4}$, 5 appears on the tape, gates $A_4$ and $B_4$ will be opened so that the "1" solenoid of the $13X_4$ group is energized and an "1" matrix is dropped from the magazine. On the other hand, if the code combination $\bar{0}$, 1, $\bar{2}$, 3, 4, $\bar{5}$ appears on the tape, gates $A_2$ and $B_3$ will be opened to energize the "f" solenoid of the $13X_2$ group.

When the switches 40 are moved to their unshift position, and the same code combinations appear in the tape, the "L" and "F" solenoids of group $13Y_4$ and $13Y_2$ respectively, will be energized. Hence, by a variety of code combinations on the tape, any number of letters and symbols may be assembled in the elevator and functions of the machines may be performed.

It will be noted that in the $13X_0$ and $13Y_0$ groups of solenoids, only seven individual solenoids have been shown. If none of the holes appear on the tape, so that the tape code is $\bar{0}$, $\bar{1}$, $\bar{2}$, $\bar{3}$, $\bar{4}$, $\bar{5}$, the tape merely continues to be fed. This is necessary since the spacing between openings is blank, and if the signal $\bar{0}$ through $\bar{5}$ were to perform some function of the machine other than mere tape feed, that particular function would operate between successive code readings of the tape.

It will also be noted that a slight variation appears in solenoids banks $13X_6$–$13Y_6$ and $13X_7$–$13Y_7$. Gate $B_6$ is connected to the eighth lead line, rather than the seventh lead line, and gate $B_7$ is connected to the seventh lead line, rather than the eighth lead line. In addition, there are only seven individual solenoids in the $13X_6$ and $13Y_6$ groups and that the first individual solenoid in the group $13X_6$ is connected to the last individual solenoid in group $13Y_6$ so that gate $A_6$ is connected to both banks of solenoids $13X_6$ and $13Y_6$. Since gate $B_6$ is connected to the "shift" solenoid and gate $B_7$ is connected to the "unshift" solenoid when code combination $\bar{0}$, 1 and 2 appears gate $A_6$ is opened and the path is directed through both the "shift" and "unshift" solenoids. However, if the code also reads $\bar{3}$, 4 and 5, then gate $B_6$ is opened which will complete the circuit to the "shift" solenoid to move the switches 40 to the position shown in FIG. 2, connecting the gates $A_0$ to $A_7$ to the solenoid groups $13Y_0$ to $13Y_7$. On the other hand, if the code combination is 3, 4 and 5, gate $B_7$ is opened which completes the circuit through the "unshift" solenoid, thereby returning the switches 40 back to the "unshift" position whereby the gates $A_0$ to $A_7$ are connected to solenoid groups $13Y_0$ to $13Y_7$.

*Shift and unshift circuit*

The shift and unshift circuit has already been described in connection with the description of the power solenoid system shown in FIG. 2. The circuit will now be described in greater detail.

Figures 18, 19:
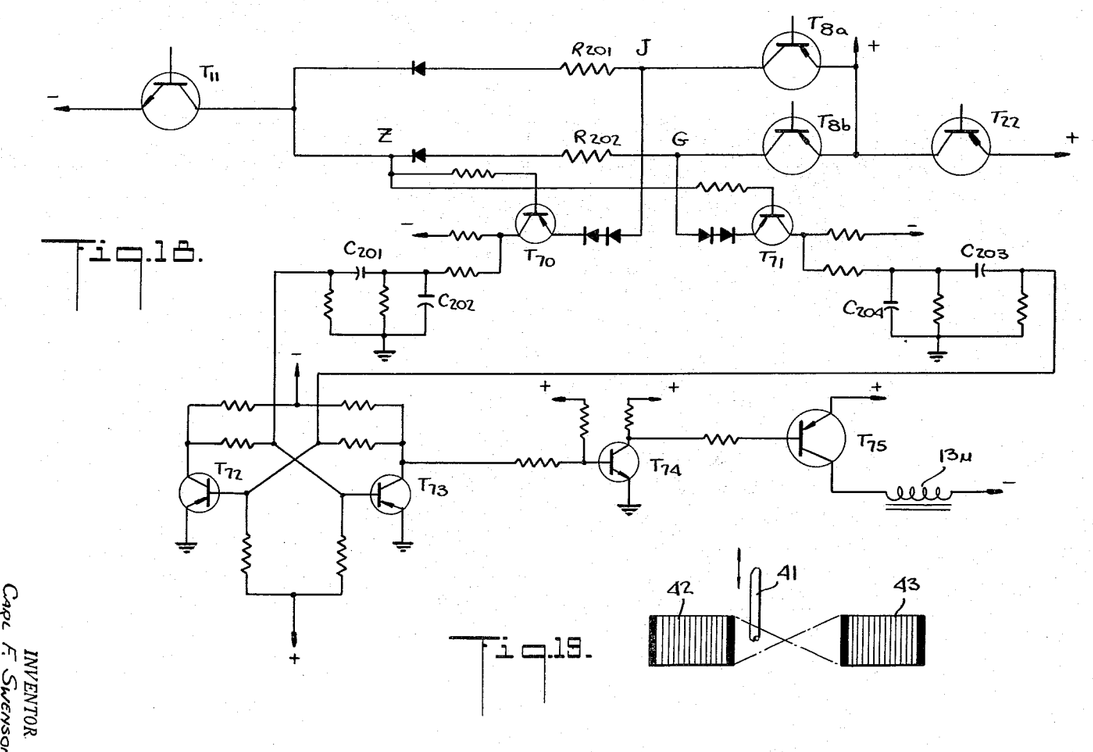
FIG. 18 is a schematic diagram showing the upper rail and lower rail circuit.
FIG. 19 is a schematic view showing the shift and unshift relays.

Instead of the usual solenoids, the shift and unshift lines contain latching-type relays 42 and 43, as shown in FIG. 19, which is an eight-pole double-throw latching type relay. The latching type relays control a shift bar 41 which connects all of the shift and unshift switches 40 together, as shown in FIG. 2. Thus, when the shift or unshift relays 42 and 43 are energized, the shift bar 41 is shifted to move the switches 40, in unison, from one bank of solenoids to the other so that the different banks of solenoids are placed in or out of the circuit.

As described above, the shift signal path is opened with the code combination on the tape reading $\bar{0}$, 1, 2, $\bar{3}$, 4, 5. When this occurs, gates $A_6$ and $B_6$ are opened and when the signal is pulsed through, the shift relay, say relay 42 in FIG. 19, will be energized to move the shift bar 41 upwardly and to place the switches 40 in the shift position, which is the position shown in FIG. 2 so that the bank of solenoids $13X_0$ to $13X_7$ in the circuit. At the same time, since the shift relay 42 is a latching type relay, the relay 42 is mechanically clamped, so that the shift bar 41 is maintained in the shift position after the signal has ended.

On the other hand, when an unshift signal is sensed, that is, when the code combination on the tape is $\bar{0}$, 1, 2, 3, 4, 5 and gates $A_6$ and $B_7$ are opened, the unshift relay 43 is energized, which depresses the shift bar 41 to move the switches 40 downwardly to the unshift position, so that the bank of solenoids $13Y_0$ to $13Y_7$ are placed in the circuit. Here again, the unshift relay 43 is a latching type relay which will mechanically hold the shift bar 41 in the unshift position until the shift code combination is again sensed and the procedure is repeated.

*Front end amplifier*

Figure 6:
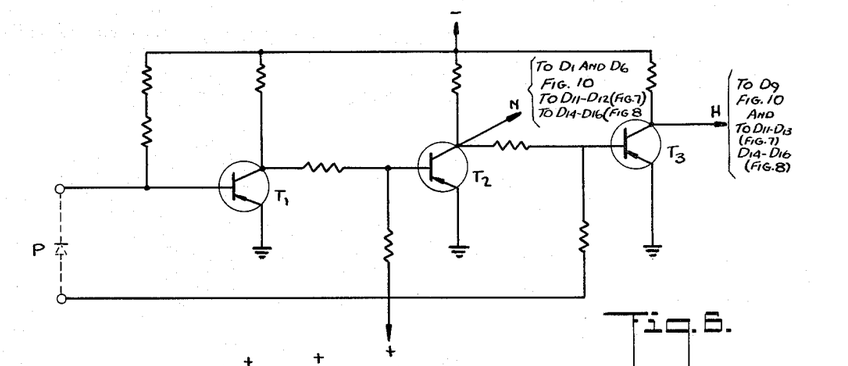
FIG. 6 is a schematic diagram of the front end amplifier utilized in the present invention.

Each photo-diode $P_0$ to $P_5$ is connected to a front end amplifier circuit which amplifies the cell signal and which determines whether there is a "hole" or a "no-hole" and conditions the memory circuit (described hereinafter) for the particular contingency. Each of the front end amplifiers are identical for each photo-diode $P_0$ to $P_5$, only one will be described for clarity.

Referring to FIG. 6, when there is a "no-hole" in the tape sensed by the photo-diode P (FIG. 6) the transistor $T_1$ (PNP) is conducting. With $T_1$ conducting, its collector is returned to ground which puts the base of transistor $T_2$ (PNP) positive thereby turning $T_2$ off. The point N is placed at a negative potential. The point N, through a "no-hole" line, leads to diodes $D_1$ and $D_6$ of gates $D_1$–$D_2$ and $D_5$–$D_6$ (FIG. 10) and to one of the diodes $D_{11}$ to $D_{13}$ of gates $A_0$–$A_7$ or $B_0$–$B_7$. The base of the transistor $T_3$ (PNP) is negative with respect to its emitter, which allows it to conduct thus placing point H at ground potential. The point H, through the "hole" line, leads to diode $D_9$ or gate $D_9$–$D_{10}$ (FIG. 10) and to one of the diodes $D_{11}$ to $D_{13}$ of Gates $A_0$–$A_7$ or $B_0$–$B_7$.

Hence, the "hole" line is now at ground and the "no-hole" line is at a negative potential.

On the other hand, if there is a "hole" in the tape and the photo-diode senses light, the opposite condition exists. The base of $T_1$ now is positive with respect to its emitter thereby turning it off, and its collector becomes negative. The base of $T_2$ becomes negative with respect to its emitter thereby turning $T_2$ on and returning point N to ground. At the same time, since the collector of $T_2$ is positive, the base of $T_3$ becomes positive, so that $T_3$ is turned off, and point N now has a negative potential. Hence, the "hole" line is now negative and the "no-hole" line is on ground potential.

In effect, when there is a hole in the tape, the "hole" line (point H) is negative and the "no-hole" line (point N) is at ground and when there is no hole in the tape, the "no-hole" line is negative and the "hole" line is at ground.

Upper decoder

As described above, each of the front end amplifiers, shown in FIG. 6, has points N or H which are either at negative or ground potential, depending on a "hole" or "no hole" situation. From a selection of three photo diodes in one of two states (on or off) a selection of eight gates is available. Each of the points N or H connects to one of the diodes $D_{11}$–$D_{13}$ of gates $A_0$ to $A_7$ (FIG. 7) which is called the upper decoder and to diodes $D_{14}$–$D_{16}$ of gates $B_0$–$B_7$ (FIG. 8) which will be referred to as the lower decoder. The upper decoder, embodying gates $A_0$ to $A_7$, will be described first with reference to FIG. 7.

Figures 9, 9A:
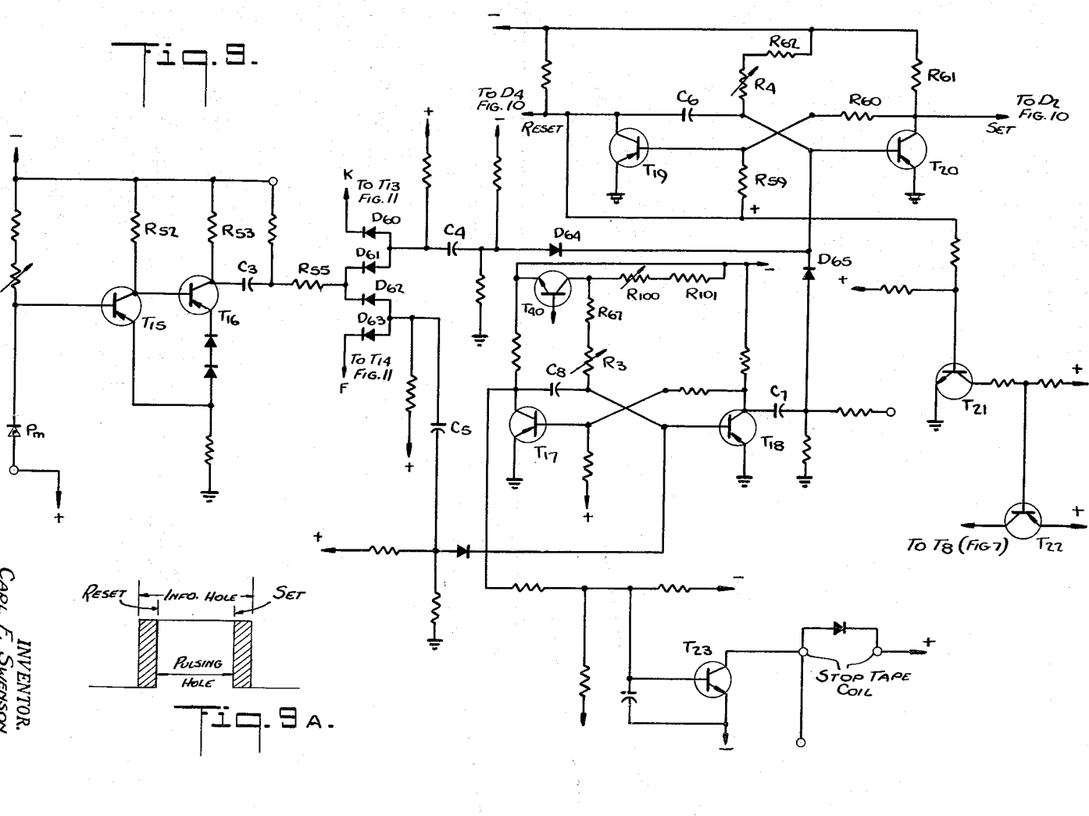
FIG. 9 is a schematic diagram showing the circuit for pulsing a signal through the predetermined circuit opened by the code openings in the tape.
FIG. 9A is a schematic view of a wave form showing the time factor for pulsing the signal through the circuit.

Each gate $A_0$–$A_7$ is an "and" gate and comprises diodes $D_{11}$, $D_{12}$ and $D_{13}$. This "and" gate controls the power switch transistor $T_8$ which is connected to one side of the solenoid bank and to the pulsing transistor $T_{22}$ (FIG. 9). Transistors $T_8$ and $T_7$ constitutes the amplifiers 16 shown in FIGS. 1 and 2.

Figure 7:
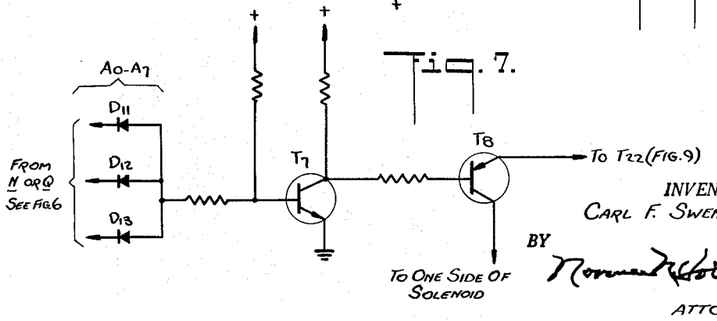
FIG. 7 is a schematic diagram showing the upper decoder adapted to decode the signals from the first three code openings on the tape.

Each of the diodes $D_{11}$–$D_{13}$ connected to points N or H of the three front end amplifiers is energized by photo diodes $P_0$–$P_2$. When the right combination of N and H points of the photo diode circuit satisfies the condition such that each of the diodes $D_{11}$–$D_{13}$ of the particular gate are at ground, then the base of transistor $T_7$ (NPN) becomes positive, which turns this transistor on and puts the base of $T_8$ (PNP) negative, which also turns transistor $T_8$ on.

Since no other gate has been satisfied for the particular code combination sensed by the first three photo-diodes $P_0$–$P_2$ only one transistor $T_8$ of the eight present will be turned on and will open a path to a single solenoid in the solenoid bank. The pulse from transistor $T_{22}$ (FIGS. 1 and 9) will then be directed through that particular solenoid to energize it.

Lower decoder

The lower decoder (FIG. 8) operates in a manner similar to the upper decoder described above and comprises transistors $T_9$ (PNP), $T_{10}$ (PNP), and $T_{11}$ (NPN) which together constitute the amplifiers 17 of the circuits shown in FIGS. 1 and 2 and which are connected to the other side of the solenoid bank.

Figure 8:
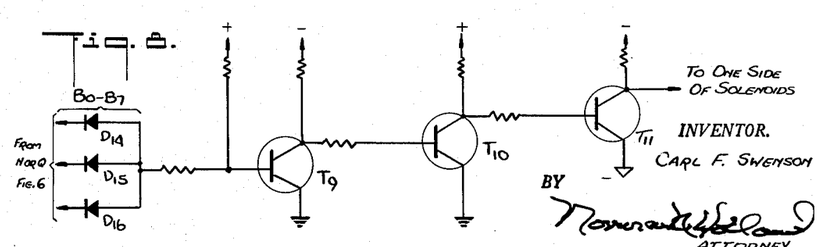
FIG. 8 is a schematic diagram showing the lower decoder adapted to decode the signals from the last three code openings in the tape.

The gate $D_{14}$–$D_{16}$ is an "and" gate, which is connected to the respective points N and H of the front end amplifier controlled by photo-diodes $P_3$ to $P_5$. Here again, there are eight identical lower decoder circuits, only one of which will be described.

Transistor $T_9$ amplifies the signal in the usual manner, transistor $T_{10}$ inverts the signal, and $T_{11}$ is a selected switching transistor and operates like transistor $T_8$ of the upper decoder (described in connection with FIG. 7).

Transistor $T_{11}$ is connected to the other sides of each of the banks of solenoids. When a particular gate is opened by a particular code combination to make one of the eight transistors $T_{11}$ of the lower decoder conduct and at the same time one of the eight transistors $T_8$ of the upper decoder is also conducting, only one of the 128 possible paths will be opened for the signal to be pulsed therethrough.

Memory and dual character circuit

During certain functions of the machine, as pointed out above, it is desirable to have a delay inserted. In addition to the usual delays for "Rub Out," "Space Band," "Add Thin Space," etc., it has been found that when two or more consecutive characters have to be used in a line of type, the magazine will drop the first matrix, but the matrix immediately behind it must travel the distance of the space occupied by the previously released matrix. The time within which the matrix will travel this distance is greater than the time within which the tape will sense an additional code combination. Therefore, unless a delay is introduced at this point, the second matrix may not fall.

In order to avoid this, the present invention embodies the use of a memory and dual character circuit which will sense whether or not two consecutive signals being read by the tape reader are identical and if so, will delay the reading of the tape and the pulsing of the signal. It will be understood that, as shown in FIG. 1, six of these circuits are used, i.e., one for each photo diode. However, only one will be described for clarity.

Figure 10:
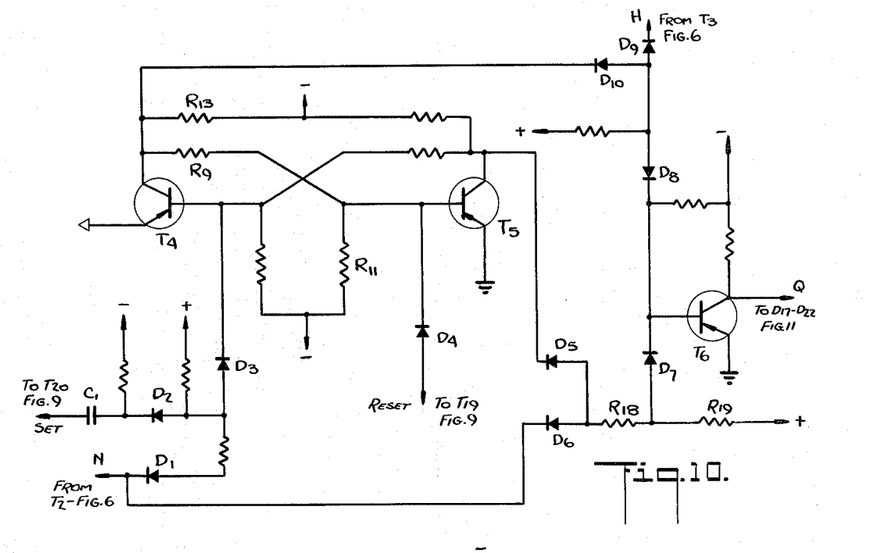
FIG. 10 is a schematic diagram showing the memory and delay circuit utilized with the present invention.

This is shown schematically in FIG. 10 in which transistors $T_4$ (PNP) and $T_5$ (PNP) represents a bi-stable oscillator. Its function is to remember whether or not the last code read by the photo-diode was a "hole" or a "no-hole." It then allows a comparison to be made of the new code coming in and, whether or not coincidence exists, the comparison between the previous code and the new code is transmitted through either diode gates $D_5$–$D_6$ or $D_9$–$D_{10}$ which control the transistor $T_6$ (PNP). The state of $T_6$ determines whether there is coincidence, and a dual character is recognized by each of the six code holes indicating coincidence.

In FIG. 9A a square wave form is shown which is like one which may be seen on the usual oscilloscope. The wave form is shown as seen from points N or H depending on whether there is a "hole" or a "no-hole." The pulsing of the signal through the circuit, as more fully described hereinafter, is controlled by the central hole M on the tape. The pulsing must take place after the particular code combination has been set, and it must be released before the code combination is re-set. Hence, the comparison of the two sets of codes must take place after the code is exposed and before the signal is pulsed through the circuit.

On the forward slope of the wave shown in FIG. 9A, the $T_4$–$T_5$ flip-flop is re-set to its normal state in which $T_5$ (PNP) is off and $T_4$–$T_5$ (PNP) is conducting, and on the return slope of the wave, the set pulse puts transistors $T_4$–$T_5$ in a state corresponding to the state of the information hole.

As described above point N is at ground for "hole" and at negative potential for "no-hole." Condenser $C_1$ has stored a positive potential from $T_{20}$ of FIG. 9 and has a positive going pulse on the "set" part of the wave. If point N is at ground, because of a "hole" structure, the base of transistor $T_4$ is brought to a positive potential, thereby shutting $T_4$ off. The voltage divider $R_{13}$–$R_9$ and $R_{11}$ puts the base of $T_5$ negative and turns it on, so that the collector of $T_5$ is at ground potential. With $T_5$ in this state, it represents a "hole" situation on the first code.

If the code sensed by the same photo-diode is also a "hole" point N is again at ground, the collector of $T_5$ is also at ground from the previous signal and the "and" gate $D_5$–$D_6$ puts the base of $T_6$ (PNP) through divider $R_{18}$–$R_{19}$ to a positive potential, thereby turning $T_6$ off. In this condition point Q is at a negative potential to activate the delay gate.

However, if the next code is a "no-hole" point N would be at a negative potential, and regardless of the fact that $T_5$ is at ground, the gate $D_5$–$D_6$ allows current to flow from a positive to a negative potential through divider $R_{18}$–$R_{19}$ to cause the base of $T_6$ to be negative, so as to allow $T_6$ to conduct and bring point Q to ground potential.

If the opposite condition exists, so that the first code is a "no-hole," then point N would have been at a negative potential when the positive signal is pulsed through. This would have no effect on the base of transistor $T_4$, and the flip-flop $T_4$–$T_5$ would remain in its normal state with $T_4$ conducting and its collector at ground potential. In this particular situation, if the next signal is another "no-hole" code, the "and" gate $D_9$–$D_{10}$ will be at ground together with the collector of transistor $T_4$ and with point H. This turns off transistor $T_6$, putting the point Q at a negative potential. If the next signal were then a "hole" then point H is at a negative potential and the collector of $T_4$ is at ground. In addition, point N is at ground and the collector of $T_5$ is at a negative potential, so that the gates $D_5$–$D_6$ and $D_9$–$D_{10}$ do not detect coincidence and $T_1$ remains in the conducting state with the point Q at ground.

It will be noted that for each photo-diode $P_0$–$P_5$ there is a point Q and that each of the points $Q_0$ to $Q_5$ must be at negative potential in order for the delay circuit (described hereinafter) to become effective.

Coincidence gates

As described above, the memory and dual character circuit determines whether there is coincidence, in which event a delay must be introduced, or whether there is no coincidence, in which event no delay is introduced.

Figure 11:
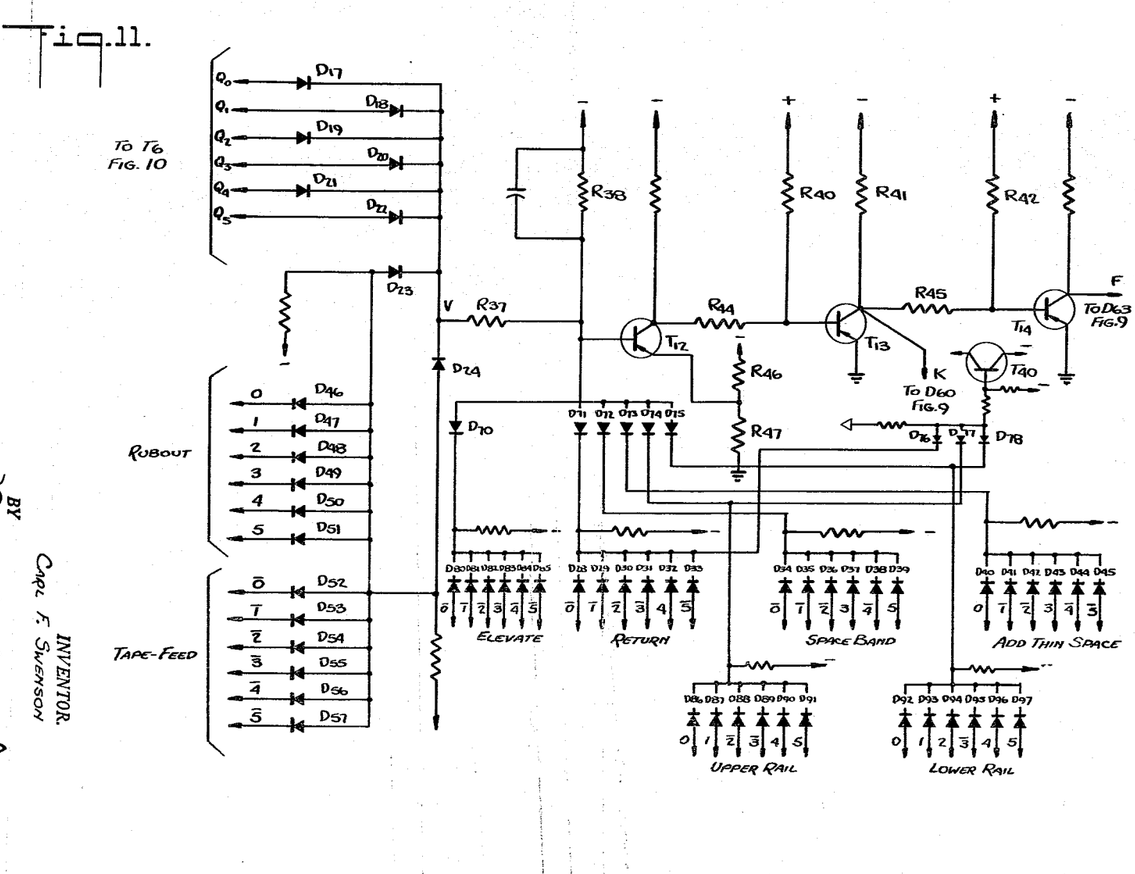
FIG. 11 is a schematic diagram showing the gating system utilized with the present invention to produce delays when desired.

The coincidence gate circuit is shown in FIG. 11 and the purpose of such a circuit is to compare all six of the memory and dual character outputs $Q_0$ to $Q_5$, so that a delay will be introduced if two successive signals are identical.

If coincidence appears on all six points $Q_0$ to $Q_5$ so that the first code and the second code are the same, it will indicate the particular condition by putting transistor $T_{14}$ (PNP) on and bringing point F to ground. This places transistor $T_{13}$ (PNP) off and point K to a negative potential.

The inputs to gate $D_{17}$–$D_{22}$ are connected to the points $Q_0$ to $Q_5$ respectively of the dual character and memory circuit shown in FIG. 10. As was seen, if coincidence existed, the points $Q_0$ to $Q_5$ was at a negative potential, whereas if no coincidence existed, one of the points $Q_0$ to $Q_5$ is at ground potential.

Under normal conditions of no coincidence one of the points $Q_0$ to $Q_5$ is at ground potential and a positive potential renders the base of transistor $T_{12}$ (PNP) positive with respect to its emitter, and hence is not conducting. Transistor $T_{13}$ is conducting because its base is negative with respect to the emitter. If $T_{13}$ is on, the base of $T_{14}$ is positive with respect to its emitter and is off. Therefore, if there is no coincidence, point F is at a negative potential and point K is at ground potential. Voltage divider $R_{46}$–$R_{47}$ places the emitter of $T_{12}$ at a negative potential. If there is no coincidence, the point V will be ground potential and the base of $T_{12}$ is then more positive because the resistance $R_{37}$–$R_{38}$ cooperate to divide the voltage.

However, if coincidence exists so that points $Q_0$ to $Q_5$ are at negative potential, point V is then dropped to a lower negative potential, and the base of $T_{12}$ at a negative potential and the voltage divider $R_{40}$–$R_{44}$ places the base of the transistor $T_{13}$ positive with respect to its emitter which shuts it off. In this condition, resistors $R_{41}$ and $R_{45}$, which are less than the resistance $R_{42}$, place the base of transistor $T_{14}$ negative with respect to its emitter to turn it on. With this arrangement for coincidence, point F is at ground potential and point K is at negative potential which introduces a delay in the circuit.

Gate $D_{17}$–$D_{22}$ may indicate coincidence by all points $Q_0$ to $Q_5$ being returned to a negative potential, but as a result of an "all-hole" or an all "no-hole" code combination, which is indicated by gates $D_{46}$–$D_{51}$ and $D_{52}$–$D_{57}$, respectively, so that all points connected to one of the gates affected would be at ground potential. In this situation, if the output of either gate is at ground, point V is also at ground and would cancel out the coincidence indication set up by the coincidence gate $D_{17}$–$D_{22}$. This is necessary so that a delay is not inserted when these two particular code combinations are sensed.

For certain signals, such as "return," "space band," "add thin space" and "elevate," a delay is also required to give the machine sufficient time to perform its particular function before continuing the reading of the tape. These are represented by gates $D_{28}$–$D_{33}$, $D_{34}$–$D_{39}$, $D_{40}$–$D_{45}$ and $D_{80}$–$D_{85}$. When any of these code combinations appear all points of the particular gate affected are returned to a negative potential through the "or" delay gate $D_{70}$–$D_{75}$, thereby placing the base of transistor $T_{12}$ negative with respect to its emitter and simulating a coincidence condition to effect a delay in the manner described above.

In addition, a delay is also desired if there is an "upper-rail" and "lower-rail" signal, represented by gates $D_{86}$–$D_{91}$ and $D_{92}$–$D_{97}$. However, it has been found that when an "upper rail" or "lower rail" function is desired and also when the "return" function is desired, a long delay is required. This is accomplished by connecting these three gates, not only to the ordinary delay gate $D_{70}$–$D_{75}$ but to long delay gate $D_{76}$–$D_{78}$. As shown in FIGS. 9 and 11 transistor $T_{30}$ (PNP) is normally conducting, that is, its base is negative. However, when a "return", "upper-rail," "lower-rail" signal enter, the positive signal turns this transistor off, causing the extra resistors $R_{100}$ and $R_{101}$ (FIG. 9) to increase the dissipation of the charge on the condenser $C_3$ and and therefore permitting a delay of greater length, as will be pointed out hereinafter.

Signal pulsing and delay circuit

A signal is pulsed through the circuit by the central photo-diode P of sensing the central opening M in the tape 15 to activate a single solenoid after a path has been opened through the circuit by the other photo-diodes $P_0$ to $P_5$, as described above.

The pulsing circuit is schematically shown in FIG. 9. The primary function of the pulsing circuit is to sense the central pulsing hole $P_m$ and to send out a timed pulse for example of about 20 milliseconds. As seen from the wave form shown in FIG. 9A the pulse must be started after the code holes have been sensed and must be released before the code holes have been released.

The pulse hole $P_m$ is triggered off only at the leading edge thereof and once the light is strong enough to reduce the resistance of its photo-diode $P_m$, it sets off a typical trigger circuit, for example, a "Schmitt trigger" circuit comprising transistors $T_{15}$ and $T_{16}$.

When the central photo-diode $P_m$ first senses the pulsing hole M, its resistance is reduced, which starts to cut-off transistor $T_{15}$ (PNP). As $T_{15}$ starts to turn off, the base of transistor $T_{16}$ (PNP) becomes negative, thereby conducting. The resistance $R_{53}$ is less than the resistance $R_{52}$ and since these two resistances are in parallel, the effective resistance is lowered which causes an increased drop across resistance $R_{56}$. With this drop in potential $T_{15}$ is turned off faster and $T_{26}$ is turned on faster so that the collector forms an abrupt square wave from negative potential to ground as shown in FIG. 9A.

The delay capacitor $C_3$ coupled between the collector of transistor $T_{16}$ and resistor $R_{55}$ and forms a positive common pulse for gates $D_{60}$–$D_{61}$ and $D_{62}$–$D_{63}$. Since point K represents no coincidence and is at ground, a positive pulse sensed through $D_{61}$ from capacitor $C_3$ causes a positive pulse from capacitor $C_4$ through $D_{64}$ to bring the base of transistor $T_{20}$ (PNP) positive with respect to its emitter thereby turning $T_{20}$ off and to set $D_2$ in FIG. 10 with a positive pulse. Capacitor $C_6$ will hold $T_{20}$ off for a predetermined time constant represented by $C_6$, variable resistor $R_4$ and $R_{62}$. Transistor $T_{19}$ (PNP) is held on for this period because while $T_{20}$ is off, the voltage divider $R_{61}$–$R_{60}$ and $R_{59}$ make the base base $T_{19}$ negative. This turns $T_{19}$ on for a predetermined time and resets $D_4$ of FIG. 10 with a positive pulse.

The base of $T_{19}$ then goes to ground, which now makes transistor $T_{21}$ conduct. With transistor $T_{21}$ on, the collector thereof goes to ground potential, and since the base of transistor $T_{22}$ lies between $R_{80}$ and $R_{81}$, it will go negative with respect to its emitter and be turned on. This permits the signal to be pulsed to the solenoids through transistor $T_8$ in FIG. 7. Hence, the transistor $T_{22}$ is the switch which pulses the signal through the network.

On the other hand, if there is coincidence point K will be at a negative potential and capacitor $C_4$ will not change its state to allow a charge through $D_{64}$. Point F will be at ground and gate $D_{62}$–$D_{63}$ becomes effective to allow a positive pulse to appear at capacitor $C_5$. This turns the base of transistor $T_{18}$ (PNP) positive, thereby turning transistor $T_{18}$ off and $T_{17}$ (PNP) on to place the base of transistor $T_{23}$ (PNP) positive with respect to its emitter. This controls the circuit of the stop tape coil which energizes stop-tape solenoid 25 (FIG. 4) so that the tape is prevented from advancing for a predetermined interval represented by $C_8$, variable resistance $R_3$ and resistance $R_{67}$. As soon as this interval of time has elapsed, capacitor $C_7$ pulses a positive charge through $D_{65}$ into the base of $T_{20}$ of the main oscillator and, as explained above, pulses the selected solenoid through the master switch transistor $T_{22}$.

In the case of the long delays required for "return," "upper-rail" and "lower-rail" $T_{40}$ is off which causes resistors $R_{100}$ and $R_{101}$ to increase the dissipation of charge on condenser $C_8$ thereby increasing the time-constant before the signal is pulsed.

It will thus be seen that if there is no coincidence the signal is pulsed through $T_{22}$ without a delay but if there is coincidence the signal is delayed for a time constant and thereafter pulsed through $T_{22}$.

Upper rail—lower rail circuit

As is common in such line-casting machines, each matrix has two characters on each of its faces. The determination of the use of a particular character of the matrix characters is controlled by assembling the matrix on an upper rail or a lower rail. The circuit for controlling the upper rail and lower rail is shown in FIG. 18.

It will be noted that the same lower decoder transistor $T_{11}$ is used for the lower rail signal and for the upper rail signal and that $T_{8a}$ is for the upper decoder upper rail signals and $T_{8b}$ is for the upper decoder lower rail signals. Between these two sets of transistors is interposed resistance $R_{201}$ and $R_{202}$ which replace the conventional solenoid between the two transistors. With this arrangement, if an upper rail signal appears, there will be a voltage drop in $R_{201}$ making the point J positive with respect to the point Z. In this condition, the transistor $T_{70}$ (PNP) will turn on putting a positive pulse across condenser $C_{201}$. The positive pulse effects the state of the oscillator $T_{72}$–$T_{73}$ turning transistor $T_{73}$ off and turning transistor $T_{74}$ (NPN) on. This starts transistor $T_{75}$ (PNP) and energizes the upper rail solenoid 13M which pulls the rail over to the upper position. At the same time, point G is the same potential as point Z and will leave that part of the circuit uneffected.

When the lower rail signal is sensed, point G becomes positive with respect to point Z, and in a similar manner transistor $T_{71}$ (PNP) of the amplifier. Transistor $T_{73}$ now conducts, which grounds the base of transistor $T_{74}$ thereby shutting off this transistor, which in turn shuts off the transistor $T_{75}$ to de-energize the upper rail solenoid to return the rail to the lower rail position by spring return.

Elevator switching circuits

Figure 14:
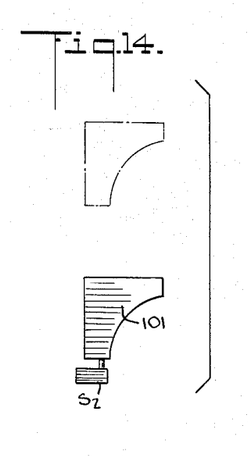
FIG. 14 is an exploded view showing the safety switches for the elevator.
Figure 15:
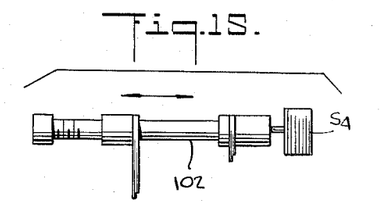
FIG. 15 is an exploded elevational view showing the safety switch for the slide carriage.
Figure 16:
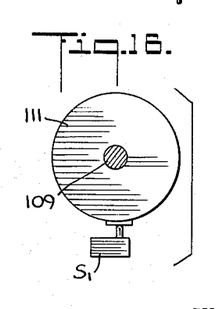
FIG. 16 is an exploded schematic view showing one of the safety switches for the elevator cam.
Figure 17:
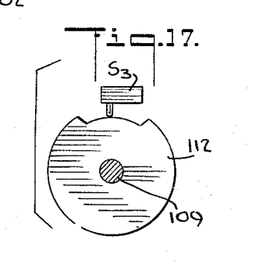
FIG. 17 is an exploded schematic view showing the other safety switch for the elevator cam.

In raising and lowering the elevator 101 (FIGS. 13 and 14) to bring a line of matrices up from the assembly position to the position where they are transferred to a delivery slide 102 (FIG. 15) there are various safety switches which prevent the tape from being read and additional matrices from being released until the elevator is back in its lowered position.

The circuit for the safety switches is shown in FIGS. 12 through 17. The solenoid E in FIG. 12 is the load between the transistors $T_8$ and $T_{11}$ which is energized when an elevate signal is pulsed through the circuit from transistor $T_{22}$, as explained above. The energization of solenoid E closes its hold contacts $E_1$ and $E_2$ to hold itself energized. Immediately the stop tape solenoid 25 is energized, which stops the tape from being read as explained above. If the delivery slide 102 on the line-casting machine is back in its normal position ready to receive matrices from the assembling elevator 101, the switch $S_4$ is closed. If the assembly elevator 101 is down in its normal position, the double throw switch $S_2$ is in its first position. Clutch 100 is energized and begins to rotate which closes the switch $S_3$ and also shifts the switch $S_2$ to its second position. When the clutch 100 raises the assembly elevator 101 to its upper position, switch $S_1$ is opened, which de-energizes the relay E. The delivery slide 102 also leaves its normal position due to the assembling elevator reaching the uppermost portion of its stroke, thereby causing the switch $S_4$ to open. When the assembling elevator has made one complete revolution and returns to its normal position, the switch $S_2$ returns to its first position to thereby remove bias to $T_{23}$ hence opening the circuit to the stop tape solenoid 25, allowing the tape to advance.

There are several other safeties which will immediately stop the tape. One such safety is switch $S_4$ which will stop the machine if the delivery slide 102 is not in its normal position ready to accept a line from the assembling elevator 101. In this case, the clutch 100 will not be energized because the switch $S_4$ is open. However, the elevate signal will be memorized until the delivery slide 102 returns to its normal position.

Should the elevator 101 not return to its down position, the switch $S_2$ would not return to its first position to de-energize the stop tape solenoid 25. Therefore, unless the assembling elevator 101 is in the proper position to accept matrices, none will be assembled after an elevate signal until all the proper conditions are met and the elevator returns to its down position.

If in raising the assembling elevator meets with resistance, a clutch (not shown) on the rubber roll front shaft 104 (FIG. 13) will slip to depress the switch $S_5$ and thereby allow the elevator to return to its normally down position, while at the same time, not destroy the elevate signal which has been memorized by the relay E. After the obstruction has been removed, the switch $S_5$ is closed and the clutch re-energized.

The switch $S_3$ holds the clutch 100 engaged for one complete revolution only, at which time the clutch 100 is de-energized and the shaft stops its rotation.

Switches $S_2$, $S_4$ and $S_5$ must be in their proper positions before the clutch 100 can be re-energized again.

Elevator raising mechanism

Applicant has provided an improved mechanism for raising the elevator. This is shown in FIG. 13 and comprises a keyboard cam rubber roll shaft 104 which is constantly being driven from a source of power.

At the end of the rubber roll front shaft 104 is a friction type clutch (not shown) which slips when a higher than normal resistance is placed on the shaft. At the other end of the front shaft 104 are a pair of miter gears 105 and 106, the output 106 of which is attached to the rotating end of a magnetic clutch 100. When the magnetic clutch 100 is energized, a worm 107 and worm gear 108 attached to the non-rotating member of the clutch is set into motion. The worm gear 108 rotates a shaft 109 which turns a crank 110 at one end and two cams 111 and 112 attached at its other end. Rotation of the crank mechanism 110 which transforms rotary motion to linear motion causes the assembling elevator 101 to rise. A complete revolution of 360° completes one raising and lowering cycle of the assembling elevator. The rotating shaft 109 operates safely the switches $S_1$ and $S_3$ described by means of cams 111 and 112 as described above.

The crank 110 is mounted on a hollow rod 115 within which is telescopically mounted an inner rod 116 which has one end mounted on elevator 101 and its other end resting on a coil spring 117 within the rod 115. This allows the elevator 101 to be raised manually by means of rod 116 if for some reason such manual operation is desired. At the same time, the spring 117 on which the inner rod rests is adapted to be compressed at the top of the elevator cycle to allow the length of the rod to be adjusted automatically and compensate for any variation of center-line distances of different line-casting machines.

OPERATION

The operation of the present invention will be obvious from the foregoing description, however, for convenience, it will be briefly reviewed with reference to FIG. 1.

The perforated tape 15 which is being read by the tape reader 20 is passed over a lamp L and beneath a photo-diode assembly P so that as each code combination in the tape passes therebeneath a corresponding combination of photo-diodes $P_0$ to $P_5$ will be activated. The tape reader has a continuous friction drive which prevents the tape from being torn and which permits more positive feeding of the tape. An adjustable feed is possible to better coordinate assembly speed with machine speed.

The signal from each photo-diode is amplified by the front end amplifier $T_1$ and depending on whether a "hole" or "no-hole" appears, the flip-flop $T_2$-$T_3$ will open a circuit to either the "no-hole" line or the "hole" line of both the upper and lower decoders.

Each of the lines is connected to several gates $A_0$ to $A_7$ for the first three photo-diodes $P_0$ to $P_2$ constituting the upper decoder and the gates $B_0$-$B_7$ are connected to the lines of the lower decoder comprising photo-diodes $P_3$ to $P_5$. A particular code combination on the tape will open a single path through the circuit which will pass through one of the solenoids 13a to 13h to perform a certain function of the machine. As the tape continues to move, the central pulsing hole M is sensed by the central photo-diode $Pm$ and a signal is pulsed through the open path to the particular solenoid through the pulsing transistor $T_{22}$ so that the magazine will drop a particular matrix or perform some other function.

Each new signal from each of the photo-diodes $P_0$ to $P_5$ is compared with the old signal by means of gates $D_7$-$D_8$ and is transferred to the coincidence gate $D_{17}$-$D_{24}$ through $T_6$. This gate will be conditioned by the signals that if the two are identical, it will actuate a delay gate $D_{70}$-$D_{75}$ which will actuate the stop tape solenoid for a predetermined time interval in order to give the second matrix time to move to the release position before the actual signal is pulsed through $T_{22}$.

In addition, several other functions, such as "return," "add thin space," "elevate," "space band," "lower rail" and "upper rail" require delays so that when these signals are sensed in the tape, the delay gate $D_{70}$-$D_{75}$ or the long delay gate $D_{76}$-$D_{78}$ is offered and a delay is inserted in the feeding of the tape.

In addition, the elevator 101 (FIG. 13) is raised by a crank 110 which moves a hollow sleeve 115 within which is telescopically mounted a rod 116. The rod 116 can be manually manipulated to raise the elevator 101 if such manual operation is necessary or desired.

It will thus be seen that the present invention provides an improved automatic line-casting machine which is inexpensive to manufacture, requires a minimum amount of maintenance, and which is electronically controlled to give a smoother and faster operation. The present invention also permits a more positive reading of the tape and will prevent the tape from being torn and which will permit the tape to be stopped instantaneously if desired.

The present invention also provides an improved mechanism for delaying the tape feeding when there is a dual character or when some other operation requires it and improved means for opening a path through the circuit and pulsing the signal therethrough. In addition, the present invention has improved means for manually raising the elevator when desired.

While a tape is shown herein and while the tape is shown as being perforated, it is within the scope of the present invention to utilize a code bearing media other than a tape and that instead of perforations other types of codes may be used. Thus, it will further be understood that while the term "tape" is used herein it is intended to include any code bearing media and when the terms "opening" "hole" or "no-hole" is used herein, it is intended to include any other type of code which may be used.

Furthermore, while the invention has been described with reference to transistors, it is within the scope of the present invention to utilize any electron discharge device.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A mechanism for operating a line-casting machine from successive code combinations on a tape, an electric circuit comprising a plurality of electric paths including "hole" lines and "no-hole" lines, function-performing means connected to said paths, means responsive to said code combinations on said tape for activating a predetermined number of said lines to select one of said paths through said activated lines, said line-activating means comprising electron discharge devices, and means for pulsing a signal through said selected path to activate said function-performing means to perform a function of said machine, said code combinations comprising a plurality of code openings and said tape including a pulsing opening and wherein means are provided to sense said code openings to condition said electron discharge devices to activate said lines and select said path and wherein means are provided to sense said pulsing opening to actuate said pulsing means for pulsing a signal through the selected path.

2. A mechanism for operating a line-casting machine from successive code combinations on a tape, an electric circuit comprising a plurality of electric paths including "hole" lines and "no-hole" lines, function-performing means connected to said paths, a plurality of gates interposed between said paths and said function-performing means, said "hole" and "no-hole" lines being connected to predetermined gates, means responsive to each of said code combinations for activating a predetermined number of said lines to select one of said paths through said activated lines and open a gate, said line activating means comprising electron discharge devices, means for pulsing a signal through said selected path to activate said function-performing means to perform a function of said machine, said code combinations comprising a plurality of code openings and said tape a pulsing opening and wherein means are provided to sense said code openings to condition said electron discharge devices to activate said lines and select said path and wherein means are provided to sense said pulsing openings to actuate said pulsing means for pulsing a signal through the selected path.

3. A mechanism for operating a line-casting machine from successive code combinations on a tape, a plurality of electric means for actuating the performance of the functions of the machine, an electric circuit having a plurality of first paths each of which is connected to one terminal of designated electric means and a plurality of second paths connected to the other terminal of said designated electric means, said first and second paths including "hole" lines and "no-hole" lines, means responsive to the code combinations on the tape for activating a predetermined number of said lines to select one of said first paths and one of said second paths through said activated lines to close a circuit through a predetermined one of said electric means, said path-selecting means comprising electron discharge devices, and means for pulsing a signal through said selected path and said closed circuit to actuate said predetermined electric means to perform a function of the machine, said code combinations comprising a plurality of code openings and said tape a pulsing opening and wherein means are provided to sense said code opening to condition said electron discharge devices to activate said lines and select one of said first paths and one of said second paths and wherein means are provided to sense said pulsing opening to actuate said pulsing means for pulsing a signal through the selected paths and said predetermined electric means.

4. A mechanism for operating a line-casting machine as claimed in claim 3 wherein the pulsing of said signal is adapted to be initiated after the code combinations on the tape are sensed and before they are released.

5. A mechanism as claimed in claim 4 wherein pulsing means includes an electron discharge device.

6. A mechanism as claimed in claim 5, wherein a trigger circuit is connected to the pulsing means.

7. A mechanism as claimed in claim 6, wherein an oscillator circuit is interposed between said trigger circuit and said electron discharge device.

8. A mechanism for operating a line-casting machine from successive code combinations on a tape, a plurality of electric means for actuating the performance of the functions of the machine, an electric circuit having a plurality of first paths each of which is connected to one terminal of designated electric means and a plurality of second paths connected to the other terminal of said designated electric means, said first and second paths including "hole" lines and "no-hole" lines, first and second gates interposed, respectively, between predetermined "hole" and "no-hole" lines and the terminals of said electric means, said "hole" and "no-hole" lines in circuit with respective said first and second gates, means responsive to the code combination in the tape for activating a predetermined number of said lines to select one of said first paths and one of said second paths through said activated lines to open one of said first gates and one of said second gates and close a circuit through a predetermined one of said electric means, said path selecting means comprising electron discharge devices, and means for pulsing a signal through said selected first and second paths to actuate said predetermined electric means to perform a function of the machine.

9. A mechanism as claimed in claim 8, wherein said code combinations comprise a plurality of code openings and said tape includes a pulsing opening and wherein means are provided to sense said code openings to condition said electron discharge devices to activate said lines and select one of said first and second paths and wherein means are provided to sense said pulsing opening to activate the pulsing means for pulsing a signal through the selected paths and said predetermined electric means.

10. A mechanism as claimed in claim 9 wherein said sensing means comprises a photo-diode means.

11. A mechanism as claimed in claim 10 wherein an amplifier is provided to amplify the signal from the photo-diode means.

12. A mechanism as claimed in claim 11 wherein a flip-flop is in circuit between said amplifier and said "hole" and "no-hole" lines and wherein the condition of said flip-flop determines whether the "hole" or the "no-hole" line is selected.

13. A mechanism as claimed in claim 12 wherein an amplifier is interposed between the said gates and the terminals of said electric means.

14. A mechanism as claimed in claim 13, wherein said signal is pulsed through the electric means through the amplifier connected to said first gates.

15. A mechanism as claimed in claim 14, wherein a diode is interposed between the electric means and said second gates to prevent feed-back.

16. A mechanism for operating a line-casting machine from successive code combinations on a tape, a plurality of electric means for actuating the performance of the functions of the machine, an electric circuit having a plurality of first paths each of which is connected to one terminal of designated electric means and a plurality of second paths connected to the other terminal of said designated electric means, said first and second paths including "hole" lines and "no-hole" lines, means responsive to the code combination on the tape for activating a predetermined number of said lines to select one of said first paths and one of said second paths through said activated lines to close a circuit through a predetermined one of said electric means, said path-selecting means comprising electron discharge devices, means for pulsing a signal through said selected path and said closed circuit to actuate said predetermined electric means to perform a function of the machine, and means delaying the pulsing of said signal for certain functions of the machine.

17. A mechanism as claimed in claim 16, wherein said delay means comprises a delay gate responsive to signals received from the tape sensing means.

18. A mechanism as claimed in claim 17 wherein said delay gate is in circuit with a delay flip-flop.

19. A mechanism as claimed in claim 18 wherein said pulsing means comprises a photo diode in circuit with a pair of gates and wherein said delay flip-flop is in circuit with said gates.

20. A mechanism as claimed in claim 18 wherein said "hole" and "no-hole" lines are in circuit with a plurality of gates which are in circuit with said delay gate.

21. A mechanism as claimed in claim 20, wherein some of said plurality of gates are in circuit with an extra delay gate which is in circuit with the flip-flop.

22. A mechanism as claimed in claim 19 wherein each of said gates is in circuit with an oscillator and wherein one of said oscillators is connected to a stop tape mechanism to stop the tape when a delay is desired and the other oscillator is in circuit with a pulsing electron discharge device.

23. A mechanism as claimed in claim 22 wherein a third oscillator is connected to each of said first and second paths and to the tape sensing means to determine whether two or more successive codes are identical.

24. A mechanism as claimed in claim 23, wherein said third oscillator is in circuit with said first mentioned oscillators and with said "no-hole" line.

25. A mechanism as claimed in claim 24 wherein said third oscillator is connected to gates and wherein said gates are connected to said "hole" and "no-hole" lines.

26. A mechanism as claimed in claim 25 wherein gates are connected to a gate which is connected to the delay gate.

27. A mechanism for operating a line-casting machine from successive code combinations on a tape, a plurality of electric means for actuating the performance of the functions of the machine, said electric means being separated into first and second sets of electric means, an electric circuit having a plurality of first paths connected to one terminal of designated electric means in said first and second sets and a plurality of second paths connected to the other terminal of said designated electric means in said first and second sets, means for shifting the connection of said first path between said first and second sets of electric means, said first and second paths including "hole" lines and "no-hole" lines, means responsive to the code combination on the tape for activating a predetermined number of said lines to select one of said first paths and one of said second paths through said activated lines to close a circuit through a predetermined one of said electric means, said path-selecting means comprising electron discharge means for pulsing a signal through said selected path and said closed circuit to actuate said predetermined electric means to perform a function of the machine, and said shifting means comprising a plurality of switches operable in unison.

28. A mechanism as claimed in claim 27, one of said electric means being adapted to shift said switches to connect said first paths to said first set of electric means and another of said electric means being adapted to shift said switches to connect said first paths to said second set of electric means.

29. A mechanism as claimed in claim 28 wherein said shifting means comprises latching-type relays.

30. A mechanism for operating a line-casting machine from successive code combinations on a tape, a reservoir of matrices, means for assembling the matrices in an elevator, said matrices being assembled on an upper rail and lower rail position, a plurality of electric means for releasing said matrices for assembling them on said elevator, an electric circuit having a plurality of first paths connected to one terminal of designated electric means and a plurality of second paths connected to the other terminal of said designated electric means, said first and second paths including "hole" lines and "no-hole" lines, means responsive to the code combination on the tape for activating a predetermined number of said lines to select one of said first paths and one of said second paths through said activated lines to close a circuit through a predetermined one of said electric means, said path selecting means comprising electron discharge devices, means for pulsing a signal through said selected path and said closed circuit to actuate said predetermined electric means to release a matrix, and one of said electric means being adapted to actuate means for assembling said matrices in an upper rail or a lower rail position.

31. A mechanism for operating a line-casting machine from successive code combinations on a tape, an electric circuit comprising a plurality of electric paths including "hole" lines and "no-hole" lines, function-performing means connected to said paths, means responsive to said code combinations on said tape for activating a predetermined number of said lines to select one of said paths through said activated lines, said line-activating means comprising electron discharge devices, pulse-forming means for pulsing a signal through said selected path to activate said function-performing means to perform a function of said machine, said tape including pulsing data thereon, means to sense said code combinations to condition said electron discharge devices to activate said lines and select said path and means being provided to sense said pulsing data to actuate said pulse-forming means for pulsing a signal through the selected path.

32. A mechanism for operating a line-casting machine from successive code combinations on a tape, an electric circuit comprising a plurality of electric paths including "hole" lines and "no-holes" lines, function-performing means connected to said paths, a plurality of gates interposed between said paths and said function-performing means, said "hole" and "no-hole" lines being connected to predetermined gates, means responsive to said code combinations for activating a predetermined number of said lines to select one of said paths through said activated lines and open a gate, said line activating means comprising electron discharge devices, pulse-forming means for pulsing a signal through said selected path to activate said function-performing means to perform a function of said machine, said tape including pulsing data thereon, means to sense said code combinations to condition said electron discharge devices to activate said lines and select said path and means to sense said pulsing data to actuate said pulse-forming means for pulsing a signal through the selected path.

33. A mechanism for operating a line-casting machine from successive code combinations on a tape, a plurality of electric means for actuating the performance of the functions of the machine, an electric circuit having a plurality of first paths each of which is connected to one terminal of designated electric means and a plurality of second paths connected to the other terminal of said designated electric means, said first and second paths including "hole" lines and "no hole" lines, means responsive to the code combinations on the tape for activating a predetermined number of said lines to select one of said first paths and one of said second paths through said activated lines to close a circuit through a predetermined one of said electric means, said path-selecting means comprising electron discharge devices, pulse-forming means for pulsing a signal through said selected path and said closed circuit to actuate said predetermined electric means to perform a function of the machine, said tape including pulsing data thereon, means to sense said code combinations to condition said electron discharge devices to activate said lines and select said path and means to sense said pulsing data to actuate said pulse-forming means for pulsing a signal through the selected path.

34. A mechanism for operating a line-casting machine from successive code combinations on a tape, a plurality of electric means for actuating the performance of the functions of the machine, said electric means being separated into first and second sets of electric means, an electric circuit having a plurality of first paths connected to one terminal of designated electric means in said first and second sets and a plurality of second paths connected to the other terminal of said designated electric means in said first and second sets, means for shifting the connection of said first path between said first and second sets of electric means, said first and second paths including "hole" lines and "no hole" lines, means responsive to the code combination on the tape for activating a predetermined number of said lines to select one of said first paths and one of said second paths through said activated lines to close a circuit through a predetermined one of said electric means, said path-selecting means comprising electron discharge pulse-forming means for pulsing a signal through said selected path and said closed circuit to actuate said predetermined electric means to perform a function of the machine, said tape including pulsing data thereon, means to sense said code combinations to condition said electron discharge devices to activate said lines and select said path and means to sense said pulsing data to actuate said pulse-forming means for pulsing a signal through the selected path.

References Cited by the Examiner

UNITED STATES PATENTS

| | | | |
|---|---|---|---|
| 1,366,579 | 1/21 | Marlatt | 199—13 |
| 1,622,291 | 3/27 | Peterson | 199—13 |
| 1,953,072 | 4/34 | Casper | 340—147 |
| 2,189,001 | 2/40 | Gould | 340—147 |
| 2,386,482 | 10/45 | Leathers et al. | 340—147 |
| 2,792,175 | 4/57 | Amundsen | 235—61.11 |
| 2,809,785 | 10/57 | Balde | 235—61.11 |
| 2,934,745 | 4/60 | Kocmanek | 340—147 |
| 2,949,600 | 8/60 | Le May et al. | 340—147 |
| 3,024,418 | 3/62 | Lanning | 340—147 |

FOREIGN PATENTS

| | | |
|---|---|---|
| 611,467 | 7/26 | France. |
| 517,021 | 1/40 | Great Britain. |

NEIL C. READ, *Primary Examiner.*

IRVING SRAGOW, *Examiner.*